(12) United States Patent
Perng (10) Patent No.: US 8,077,827 B2
(45) Date of Patent: Dec. 13, 2011

(54) METHOD FOR THICKNESS CALIBRATION AND MEASURING THICKNESS OF MATERIAL

(75) Inventor: Ming-Hwei Perng, Hsinchu (TW)

(73) Assignee: Test Research, Inc., Taipei (TW)

( * ) Notice: Subject to any disclaimer, the term of this patent is extended or adjusted under 35 U.S.C. 154(b) by 160 days.

(21) Appl. No.: 12/711,230

(22) Filed: Feb. 23, 2010

(65) Prior Publication Data

US 2011/0206182 A1    Aug. 25, 2011

(51) Int. Cl.
*G01N 23/06* (2006.01)
(52) U.S. Cl. .......................... 378/56; 378/207
(58) Field of Classification Search .............. 378/51–56, 378/207
See application file for complete search history.

(56) References Cited

U.S. PATENT DOCUMENTS

| | | | | |
|---|---|---|---|---|
| 4,442,496 A | * | 4/1984 | Simon et al. ............... | 250/252.1 |
| 5,291,535 A | | 3/1994 | Baker | |
| 5,335,260 A | * | 8/1994 | Arnold .......................... | 378/207 |
| 5,923,726 A | * | 7/1999 | Regimand ..................... | 378/207 |
| 6,148,057 A | * | 11/2000 | Urchuk et al. .................. | 378/18 |
| 6,201,850 B1 | * | 3/2001 | Heumann ....................... | 378/56 |

* cited by examiner

*Primary Examiner* — Hoon Song (74) *Attorney, Agent, or Firm* — CKC & Partners Co., Ltd.

(57) ABSTRACT

A method for measuring the thickness of a first absorbing material in the presence of a second absorbing material is provided. The method comprises the steps as follow. The thickness ($t_S$) of the first absorbing material is fixed and the thickness of the second absorbing material is varied to obtain a calibration standard. The intensity of the transmissive energy passing through the calibration standard is detected by acquiring multiple pairs of image data comprising a foreground value ($\log_n(I_{c+s})$) and a background value ($\log_n(I_c)$). The thickness ($t_{Si}$) of the first absorbing material is changed and the above steps are repeated to obtain sets of image data. A fitting constant $I_d$ is determined to describe each set of the intensity data as $$\frac{\mu_s}{\alpha} t_S = \log_n(I_c + I_d) - \log_n(I_{c+s} + I_d).$$

A best fit of the proportional constant $$\frac{\mu_s}{\alpha}$$

is determined to further calculate an unknown thickness of the first absorbing material ($t_s'$) through the equation $$t_s' = \frac{\alpha}{\mu_s}[\ln(I_c' + I_d) - \ln(I_{c+s}' + I_d)].$$

20 Claims, 6 Drawing Sheets

METHOD FOR THICKNESS CALIBRATION AND MEASURING THICKNESS OF MATERIAL

BACKGROUND

1. Technical Field

The present disclosure relates to a measuring method. More particularly, the present disclosure relates to a method for thickness calibration and for measuring the thickness of a first absorbing material in the presence of a second absorbing material.

2. Description of Related Art

With the evolution of electronic technology, electronic devices become more complicate then ever before but with its size getting smaller and lighter. In is order to maintain the stability and correctness of the data transmission, a careful and precise inspection is needed to perform on the soldering and assembly of electronic devices.

In conventional design, an X-ray system is used to make the inspection. The images or pictures formed represent the X-ray shadow cast by an object being inspected when it is illuminated by a beam of X-rays. The X-ray shadow is detected and recorded by an X-ray sensitive material such as film or electronic means. In automated X-ray inspection of printed circuit assemblies, gray-scale images of interconnects or slices thereof are examined to detect improper joints and/or to provide statistical process control data relating to the manufacturing process. In characterizing solder joints, for example, it is preferable to deal with measured joint thickness rather than gray scale pixel values. However, extracting solder thickness from the measure gray scale pixel values is complicated by several factors. For example, in passing through a printed circuit assembly, X-rays will typically encounter other absorbers in addition to the solder, e.g. copper ground planes, tantalum capacitors, etc. Each material has its own characteristic absorption spectrum. The resulting interaction is highly non-linear, and complete characterization of the thickness of the solder and other shading materials in the path is generally not possible from a limited number of gray scale calibration measurements.

Some approximation methods can be used to estimate the thickness of the solder such as U.S. Pat. No. 6,201,850 entitled "ENHANCED THICKNESS CALIBRATION AND SHADING CORRECTION FOR AUTOMATIC X-RAY INSPECTION". However, the lack of the theoretical basis of the hypothesis of the non-linear relationship between the gray scale pixel values and the X-ray energy may lead to an inaccuracy of the measurement. In addition, using the look-up table constructed after the calibration process to estimate the thickness of the solder is time-consuming.

Thus, what is needed is a quick and precise method for measuring the thickness of material in a precise way. The present disclosure addresses the need.

SUMMARY

An aspect of the present disclosure is to provide a method for calibrating an transmissive energy imaging system for quantitatively determining the thickness of a first absorbing material in the presence of a second absorbing material where an incident transmissive energy having an incident intensity is transmitted through the first and second absorbing materials, wherein the method includes the steps as follow. The thickness ($t_S$) of the first absorbing material is fixed and the thickness of the second absorbing material is varied to obtain a calibration standard having a multiple combinations of thicknesses of the first and the second absorbing material. The calibration standard is exposed to the incident transmissive energy. The intensity of the incident transmissive energy which passes through the calibration standard is detected by acquiring multiple pairs of image data which are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired. The thickness ($t_{Si}$) of the first absorbing material is changed to other fixed thicknesses and the above steps are repeated to obtain a plurality sets of intensity data, wherein each set of the intensity data corresponds to a fixed thickness of the first absorbing material. A fitting constant $I_d$ is determined such that a plurality of intercept values $$\left(\frac{\mu_s}{\alpha} t_{Si}\right)$$

are each described by a line as a function of one of the set of the intensity data, wherein the line has the general form of:

$$\frac{\mu_s}{\alpha} t_S = \log_n(I_c + I_d) - \log_n(I_{c+s} + I_d) \text{ where } \frac{\mu_s}{\alpha}$$

is related to the characteristic of the first absorbing material and the generation process of the image data. A best fit of the proportional constant $$\frac{\mu_s}{\alpha}$$

is determined to accomplish the calibration.

Another aspect of the present disclosure is to provide a method for calibrating an transmissive energy imaging system for quantitatively determining the thickness of a first absorbing material in the presence of a second absorbing material where an incident transmissive energy having an incident intensity is transmitted through the first and second absorbing materials, wherein the to method includes the steps as follow. The thickness ($t_S$) of the first absorbing material is fixed and the thickness of the second absorbing material is varied to obtain a calibration standard having a multiple combinations of thicknesses of the first and the second absorbing material. The calibration standard is exposed to the incident transmissive energy. The intensity of the incident transmissive energy which passes through the calibration standard is detected by acquiring multiple pairs of image data which are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired. The thickness ($t_{Si}$) of the first absorbing material is changed to other fixed thicknesses and the above steps are repeated to obtain a plurality sets of intensity data, wherein each set of the intensity data corresponds to a fixed thickness of the first absorbing material. A constant $I_d$ is determined by performing experiments on the detector to find out the relation between an incident energy and a detected intensity. A best fit of the proportional constant $$\frac{\mu_s}{\alpha}$$

is determined to accomplish the calibration such that a plurality of intercept values $$\left(\frac{\mu_s}{\alpha}t_{Si}\right)$$

are each described by a line as a function of one of the set of the intensity data, wherein the line has the general form of:

$$\frac{\mu_s}{\alpha}t_S = \log_n(I_c + I_d) - \log_n(I_{c+s} + I_d), \text{ where } \frac{\mu_s}{\alpha}$$

is related to the characteristic of the first absorbing material and the generation process of the image data.

Yet another aspect of the present disclosure is to provide a method for measuring the thickness of a first absorbing material in the presence of a second absorbing material comprising the steps as follow. The thickness ($t_S$) of the first absorbing material is fixed and the thickness of the second absorbing material is varied to obtain a calibration standard having a multiple combinations of thicknesses of the first and the second absorbing material. The calibration standard is exposed to a source of transmissive energy having an incident intensity. The intensity of the transmissive energy which passes through the calibration standard is detected by acquiring multiple pairs of image data which are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired. Thickness ($t_{Si}$) of the first absorbing material is changed to other fixed thicknesses and the above steps are repeated to obtain a plurality sets of intensity data, wherein each set of the intensity data corresponds to a fixed thickness of the first absorbing material. A fitting constant $I_d$ is determined such that a plurality of intercept values $$\left(\frac{\mu_s}{\alpha}t_{si}\right)$$

are each described by a line as a function of one of the set of the intensity data, wherein the line has the general form of:

$$\frac{\mu_s}{\alpha}t_s = \log_n(I_c + I_d) - \log_n(I_{c+s} + I_d) \text{ where } \frac{\mu_s}{\alpha}$$

is related to the characteristic of the first absorbing material and the generation process of the image data. A best fit of the proportional constant $$\frac{\mu_s}{\alpha}$$

is determined to accomplish the calibration. Foreground ($I_{c+s}'$) and background ($T_c'$) values are measured for a combination of the first and the second absorbing materials having unknown thicknesses. The corresponding unknown thickness of the first absorbing material ($t_s'$) is determined through the calculation of the following equation:

$$t_s' = \frac{\alpha}{\mu_s}[\log_n(I_c' + I_d) - \log_n(I_{c+s}' + I_d)], \text{ where } \frac{\alpha}{\mu_s}$$

is the proportional constant determined previously.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows:

FIG. 5 is a graph of the intercept value $$\frac{\mu_s}{\alpha}t_{si}$$

and the thickness $t_{si}$ according to one embodiment of this disclosure; and

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
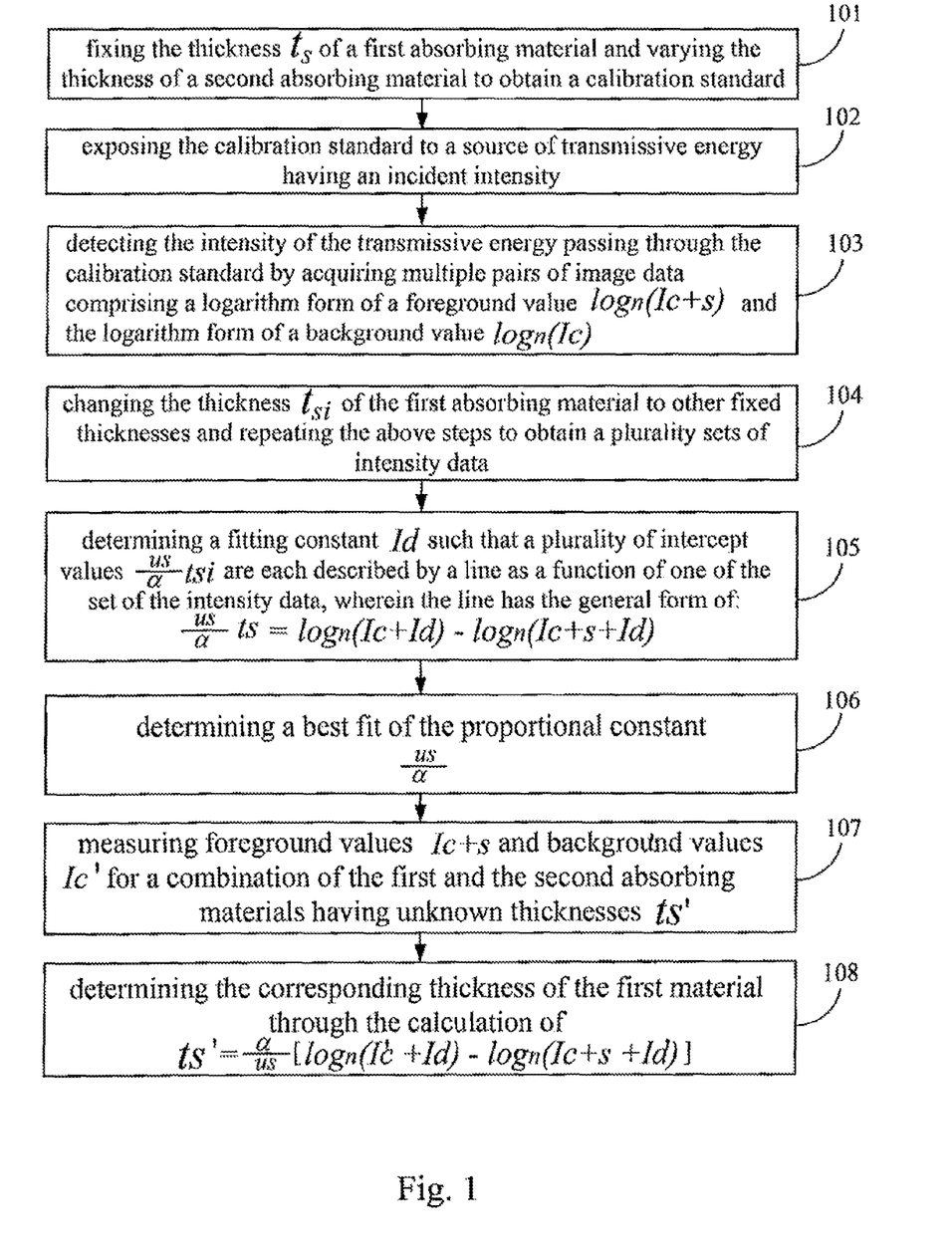
FIG. 1 is a flow chart of the method for measuring the thickness of a first absorbing material in the presence of a second absorbing material in the present disclosure.

Please refer to FIG. 1. FIG. 1 is a flow chart of the method for measuring the thickness of a first absorbing material in the presence of a second absorbing material in the present disclosure. In an embodiment, the second absorbing material is to form a circuit board and the first absorbing material is to form the joints on the circuit board. The combination of the first and the second absorbing material is able to provide a model of the environment of the circuit board. In an embodiment, the first absorbing material is solder and the second absorbing material is copper. However, in other embodiment, the first and the second absorbing material can be other kind of material as well.

Therefore, through the use of X-ray or other possible penetrating radiation, the soldering and assembly on the circuit board can be detected by the radiographic technology to see if there is any improper joint.

In conventional design, an X-ray system is used to make the inspection. The images or pictures formed represent the X-ray shadow cast by an object being inspected when it is illuminated by a beam of X-rays. The X-ray shadow is detected and recorded by an X-ray sensitive material such as film or electronic means. In automated X-ray inspection of printed circuit assemblies, gray-scale images of interconnects or slices thereof are examined to detect improper joints and/or to provide statistical process control data relating to the manufacturing process. In characterizing solder joints, for example, it is preferable to deal with measured joint thickness rather than gray scale pixel values. However, extracting solder thickness from the measure gray scale pixel values is complicated by several factors. For example, in passing through a printed circuit is assembly, X-rays will typically encounter other absorbers in addition to the solder, e.g. copper ground planes, tantalum capacitors, etc. Each material has its own characteristic absorption spectrum. The resulting interaction is highly non-linear, and complete characterization of the thickness of the solder and other shading materials in the path is generally not possible from a limited number of gray scale calibration measurements.

Some approximation methods can be used to estimate the thickness of the solder such as U.S. Pat. No. 6,201,850 entitled "ENHANCED THICKNESS CALIBRATION AND SHADING CORRECTION FOR AUTOMATIC X-RAY INSPECTION". However, the lack of the theoretical basis of the hypothesis of the non-linear relationship between the gray scale pixel values and the X-ray energy may lead to an inaccuracy of the measurement. In addition, using the look-up table constructed after the calibration process to estimate the thickness of the solder is time-consuming.

Figure 2:
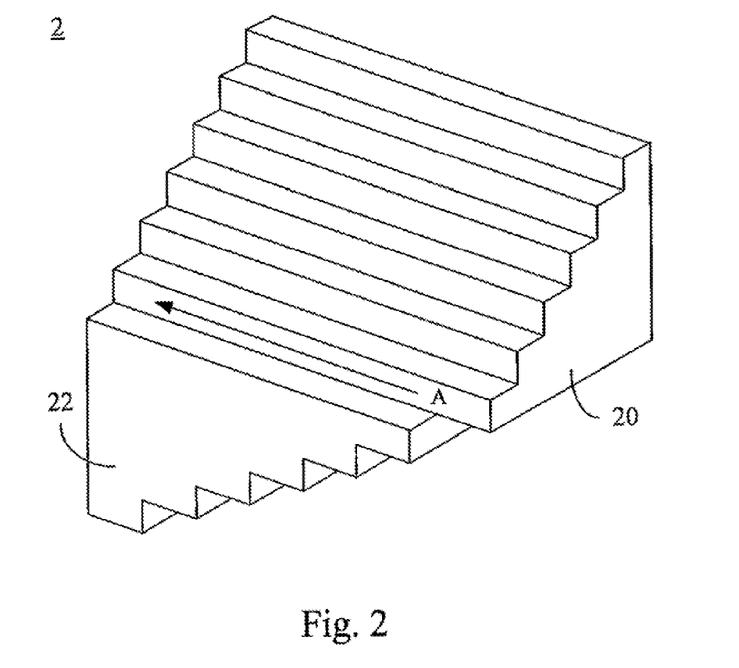
FIG. 2 is a diagram of the calibration standard in an embodiment of the present disclosure.

In step 101, the thickness ($t_S$) of a first absorbing material is fixed and the thickness of a second absorbing material is varied to obtain a calibration standard having a multiple combinations of thicknesses of the first and the second absorbing material. Please refer to FIG. 2. FIG. 2 is a diagram of the calibration standard 2. The calibration standard 2 comprises two calibration step wedges 20 and 22. The stretching directions of two calibration step wedges 20 and 22 are perpendicular to each other, wherein in an embodiment, the calibration step wedge 20 is made of the first absorbing material and the calibration step wedge 22 is made of the second absorbing material. Therefore, each row of the calibration step wedges 20 is a fixed thickness of the first absorbing material. By gradually moving toward the A direction depicted in FIG. 2, the thickness of a second absorbing material is varied, and the multiple combinations of thicknesses of the first and the second absorbing material with the fixed thickness of the first absorbing material is obtained.

Figure 3:
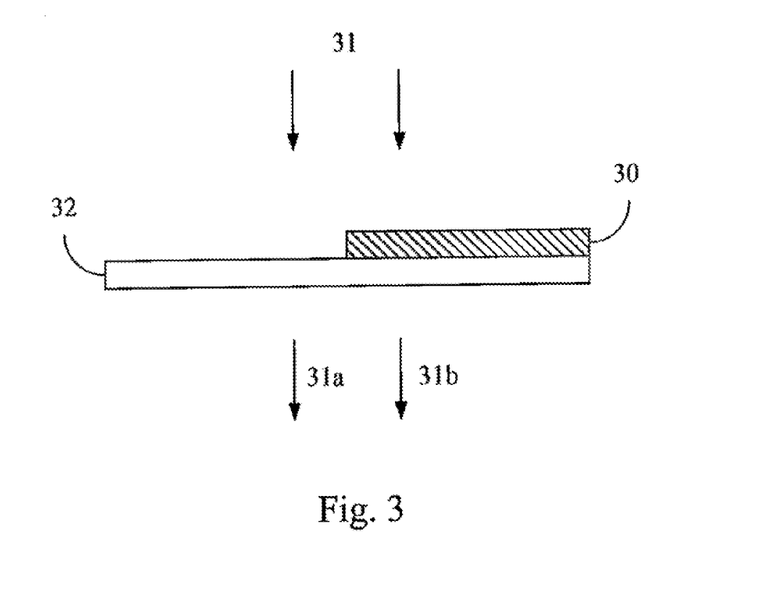
FIG. 3 is a side view of a first absorbing material placing on the second absorbing material in an embodiment of the present disclosure.

In step 102, the calibration standard is exposed to a source of transmissive energy having an incident intensity. In an embodiment, the transmissive energy is provided by an X-ray beam. Please refer to FIG. 3. FIG. 3 is a side view of a first absorbing material 30 placing on the second absorbing material 32. In FIG. 3, only one layer of the first absorbing material 30 and one layer of the second absorbing material 32 are depicted instead of showing the whole calibration standard depicted in FIG. 2. The X-ray beam 31 with energy $E_0$ passes from the top to the bottom of the first and the second absorbing material 30 and 32. While the X-ray beam 31 passes through only the second absorbing material 32, it becomes the X-ray beam 31a. While the X-ray beam 31 passes through the combination of the first and the second absorbing material 30 and 32, it becomes the X-ray beam 31b.

Both the first and the second absorbing material 30 and 32 are able to absorb a portion of the energy of the X-ray beam 31. However, due to the different characteristic of the first and the second absorbing material 30 and 32, they absorbs different amount of energy respectively. Therefore, the remaining energy of the X-ray beam 31a is $E_c$, and the remaining energy of the X-ray beam 31b is $E_{c+s}$.

The relation of the energy between the original X-ray beam 31 and the energy-absorbed X-ray beam 31a and 31b can be expressed as the form of:

$$E_c/E_0 = e^{-\mu_c t_c} \quad (1)$$

$$E_{c+s}/E_0 = e^{-\mu_c t_c} e^{-\mu_s t_s} \quad (2)$$

where $\mu_s$ is the absorption coefficient of the first absorbing material, $t_s$ is the thickness of the first absorbing material, $\mu_c$ is the absorption coefficient of the second absorbing material, $t_c$ is the thickness of the second absorbing material.

If the base is e, the natural logarithm form of the equation (1) and (2) becomes:

$$\ln(E_c/E_0) = \ln E_c - \ln E_0 = -\mu_c t_c \quad (1')$$

$$\ln(E_{c+s}/E_0) = \ln E_{c+s} - \ln E_0 = -\mu_s t_s - \mu_c t_c = -\mu_s t_s + (\ln E_c - \ln E_0) \quad (2')$$

Hence from (1') and (2'), an equation is obtained:

$$\ln E_{c+s} = \ln E_c - \mu_s t_s \quad (3)$$

Then in step 103, the intensity of the transmissive energy that passes through the calibration standard is detected. The detecting process is performed by acquiring multiple pairs of image data which are representative of a portion of the transmissive energy, such as $E_c$ and $E_{c+s}$ described above, which is measured after transmission through the first and the second absorbing materials.

However, the intensity detected on the image data is represented by the gray level of the image. Suppose that the relation between the energy and the intensity is in the form of:

$$E = a(I + I_d)^\alpha \quad (4)$$

where a, $I_d$ and $\alpha$ are sensor parameters of the detector.

Therefore, if the background value, which is the intensity of the X-ray beam 31a passing through only the second absorbing material 32, is $I_c$, and the foreground value, which is the intensity of the X-ray beam 31b passing through the combination of first and the second absorbing material 30 and 32, is $I_{c+s}$, the equation (3) becomes the form of:

$$\ln[a(I_{c+s}+I_d)^\alpha] = \ln a + \alpha \ln(I_{c+s}+I_d) = \ln[a(I_c+I_d)^\alpha] - \mu_s t_s = \ln a + \alpha \ln(I_c+I_d) - \mu_s t_s$$

Therefore, the above equation becomes:

$$\ln(I_{c+s} + I_d) = \ln(I_c + I_d) - \frac{\mu_s}{\alpha} t_s \qquad (5)$$

or equivalently, $$t_s = \frac{\alpha}{\mu_s}[\ln(I_c + I_d) - \ln(I_{c+s} + I_d)] \qquad (6)$$

Therefore, the equation (6) clearly shows the relation between the thickness of the first absorbing material 30 ($t_s$)) and the intensity of both of the X-ray beams 31a and 31b passing through only the second absorbing material 32 ($I_c$) and through the combination of the first and the second absorbing material 30 and 32 ($I_{c+s}$) respectively.

By moving toward the direction A depicted in FIG. 2, the thickness of the first absorbing material is fixed and the thickness of the second absorbing material gradually increases. Therefore, a set of intensity data $I_{c+s}$ and $I_c$ is obtained.

Figure 4A:
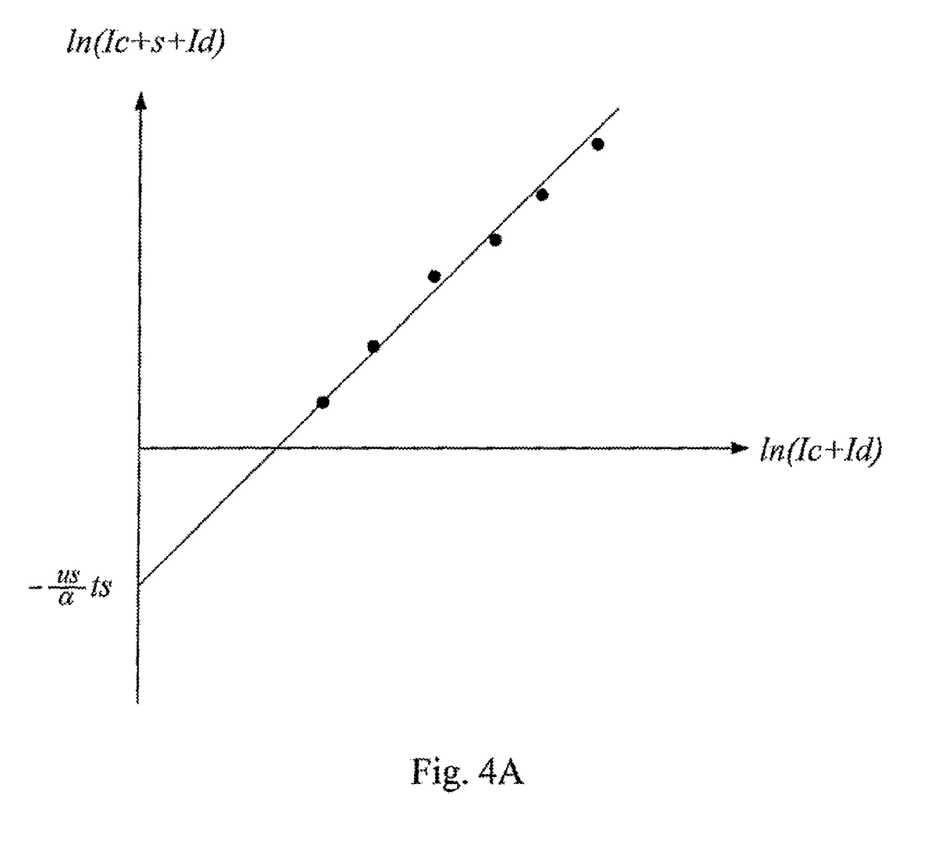
FIG. 4A is a graph depicting a set of intensity data in the linear form according to one embodiment of this disclosure.

According to equation (5), the set of intensity data $I_{c+s}$ and $I_c$ can be expressed as a linear equation when they are in the logarithm form if the sensor parameters $I_d$ and $\alpha$ is known. Please refer to FIG. 4A. FIG. 4A is a graph depicting a set of intensity data in the linear form, while the x-axis is $\ln(I_c+I_d)$, and the y-axis is $\ln(I_{c+s}+I_d)$. Therefore, the value of the intercept point is $$-\frac{\mu_s}{\alpha} t_s,$$

and the slope of the line is 1.

Figure 4B:
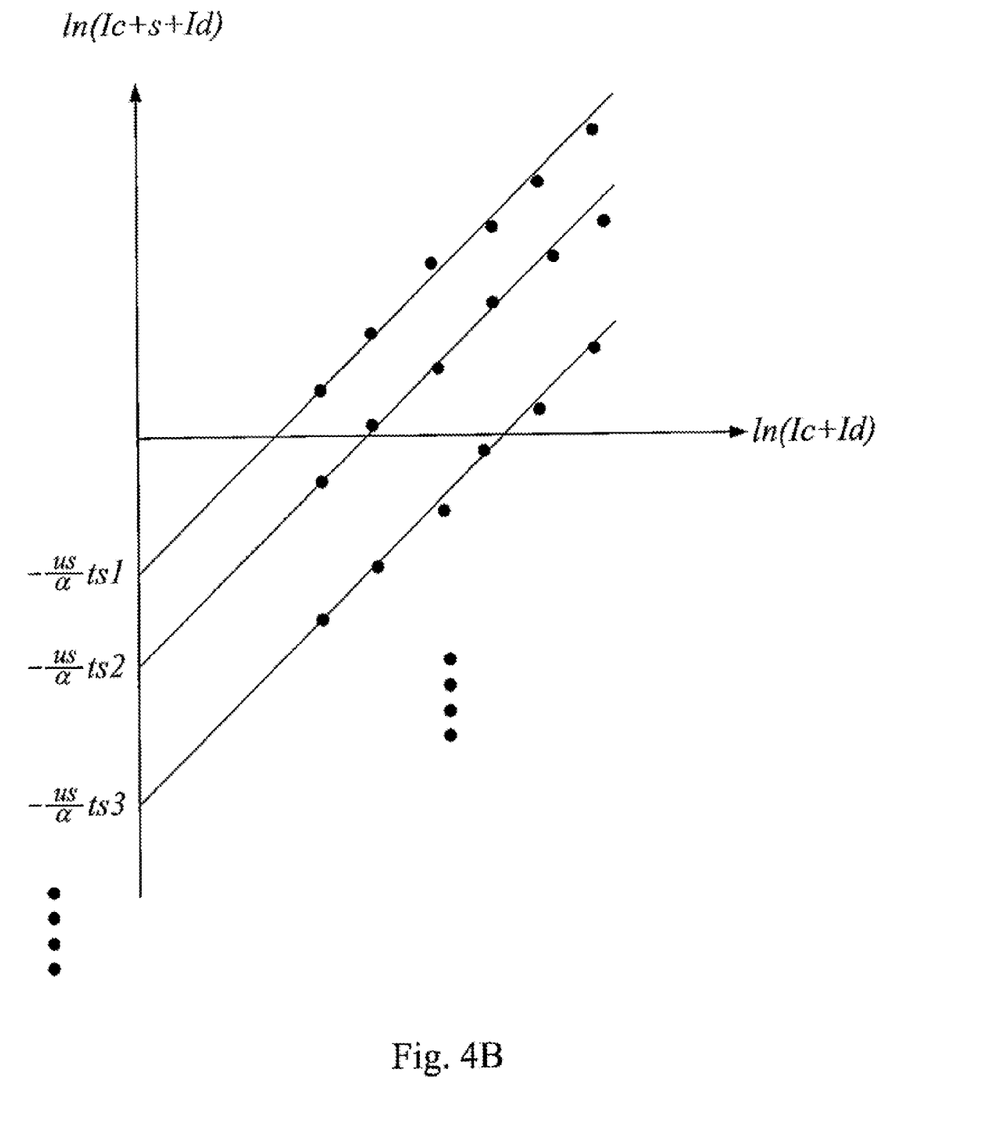
FIG. 4B is a graph depicting a plurality set of intensity data in the linear form according to one embodiment of this disclosure.

Then in step 104, by changing the thickness of the first absorbing material to other fixed thicknesses ($t_{si}$) and repeating the above steps, a plurality sets of intensity data can be obtained, wherein each set of the intensity data corresponds to a fixed thickness of the first absorbing material. Please refer to FIG. 4B. FIG. 4B is a graph depicting a plurality set of intensity data in the linear form. Each set of intensity data corresponds to a line in FIG. 4B.

Due to the characteristic of equation (5), the parameter $\alpha$ and the coefficient $\mu_s$ can be merged. However, the parameter $I_d$ can't be merged and has to be determined. Therefore, in step 105, a fitting constant $I_d$ is determined.

Figure 5:
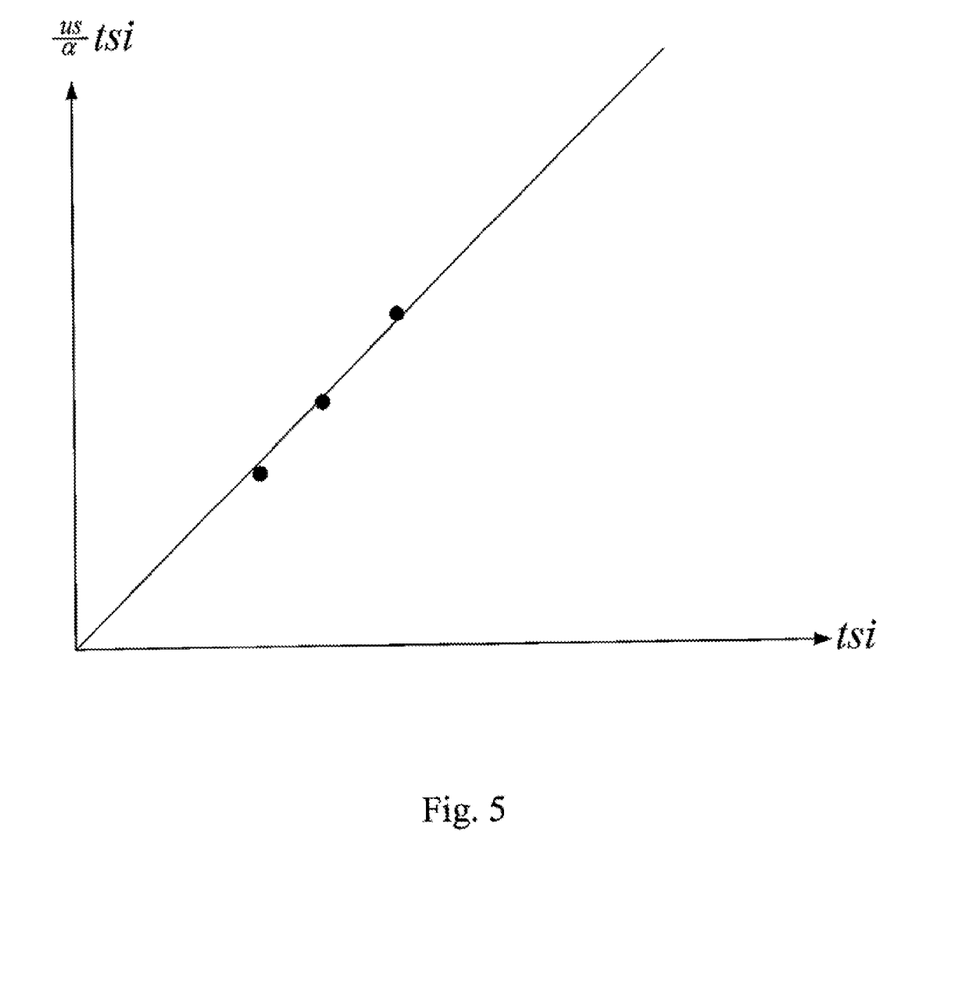

In an embodiment, $I_d$ can be determined with trial and error. The selected $I_d$ should make each of the lines close to the corresponding set of intensity data. Therefore, from all the intercept value and the known thickness, a graph of the intercept value $$\frac{\mu_s}{\alpha} t_{si}$$

and the thickness $t_{si}$ can be obtained, as depicted in FIG. 5. Then in step 106, by using the experimental data $$\frac{\mu_s}{\alpha} t_{si}$$

and the known thickness $t_{si}$, a best fit of the proportional constant $$\frac{\mu_s}{\alpha}$$

can be determined to accomplish the calibration. Through the calibration steps, the characteristic of the first absorbing material, the second absorbing material and the detector can be described as equation (5), which is $$\ln(I_{c+s} + I_d) = \ln(I_c + I_d) - \frac{\mu_s}{\alpha} t_s.$$

Therefore, the measuring steps can be performed depending on the calibration result.

In step 107, a foreground value $I_{c+s}'$ and a background value $I_c'$ for a combination of the first and the second absorbing materials having unknown thicknesses is measured.

Then in step 108, the corresponding unknown thickness $t_s'$ of the first absorbing material is determined through the calculation of the constant $$\frac{\mu_s}{\alpha}$$

and the logarithm form of the foreground and background values for the combination of the first and the second absorbing materials having unknown thicknesses. In other words, because the $$\frac{\mu_s}{\alpha}$$

is the proportional constant determined previously, which is a known value, and the intensity $I_{c+s}$ and $I_c$ are measured through the X-ray detector, the unknown thickness of the first absorbing material can be calculated through equation (6), which is $$t_s = \frac{\alpha}{\mu_s}[\ln(I_c + I_d) - \ln(I_{c+s} + I_d)].$$

It's noticed that the base of the logarithm form can be a number different from e. However, due to the characteristic of the energy equation, the complexity of the calculation is much lower if e is chosen. Also, the method described above can be used to detect different material other than solder and copper. A different penetrating radiation source and detector can be used as well.

Figure 6:
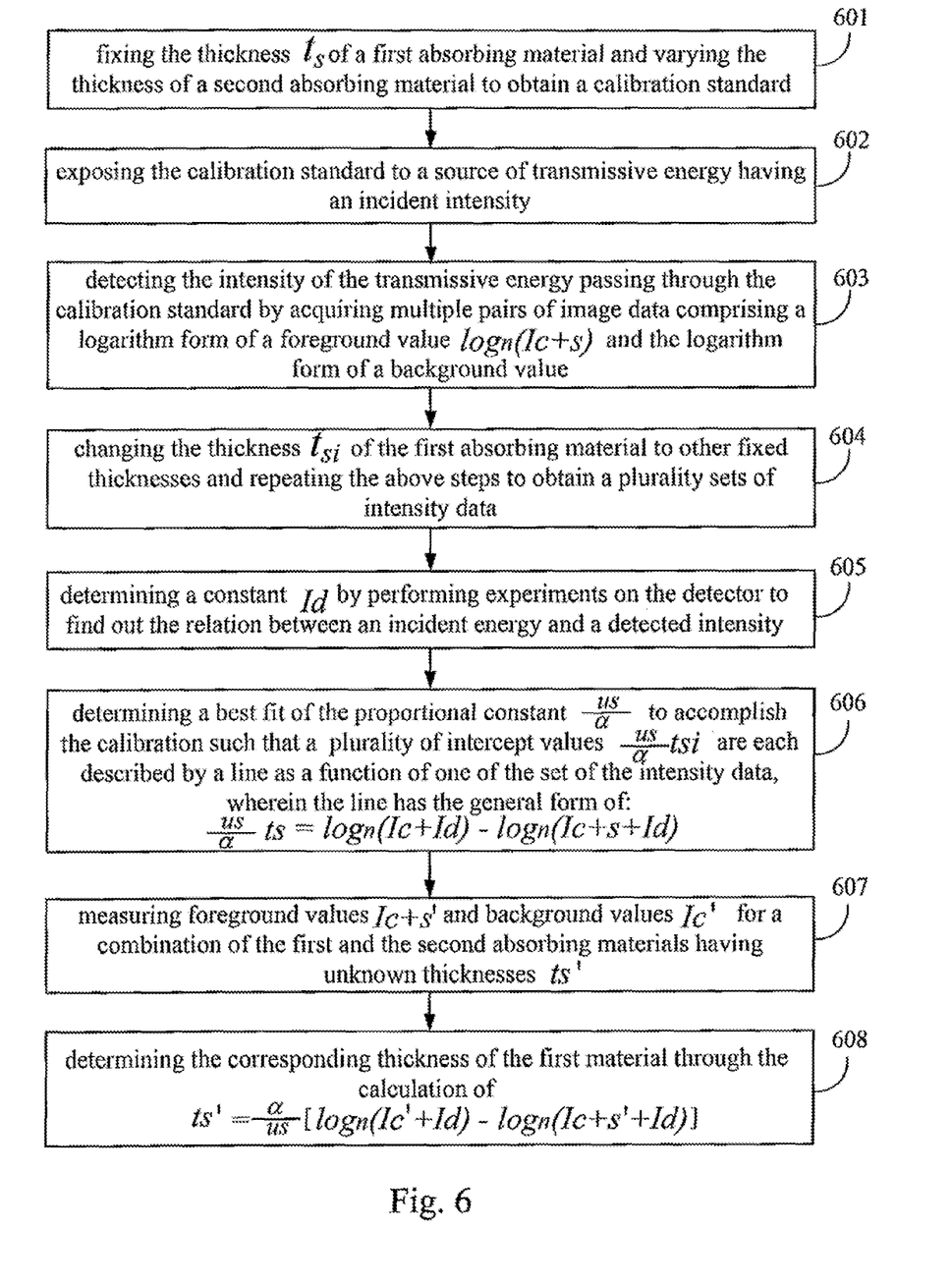
FIG. 6 is a flow chart of the method for measuring the thickness of a first absorbing material in the presence of a second absorbing material in another embodiment of the present disclosure.

In another embodiment, the $I_d$ can be determined by performing experiments on the detector to find out the relation between an incident energy and a detected intensity. Please refer to FIG. 6. FIG. 6 is a flow chart of the method for measuring the thickness of a first absorbing material in the presence of a second absorbing material in another embodiment of the present disclosure.

Substantially, the step 601 to step 604 are the same as the embodiment shown in FIG. 1. After step 604, step 605 is performed to determine the constant $I_d$ related to the detector by performing experiments on the detector to find out the relation between an incident energy and a detected intensity, wherein the relation is described in equation (4). Then in step 606, the best fit of the proportional constant $$\frac{\mu_s}{\alpha}$$

is directly determined to accomplish the calibration such that a plurality of intercept values $$\left(\frac{\mu_s}{\alpha} t_{Si}\right)$$

are each described by a line as a function of one of the set of the intensity data, wherein the line has the general form of equation $$\frac{\mu_s}{\alpha} t_S = \log_n(I_c + I_d) - \log_n(I_{c+s} + I_d).$$

Then the measuring steps 607 and 608, which is the same as the step 107 and 108 in FIG. 1, are performed.

In the present embodiment, the constant $I_d$ is directly determined by performing experiment on the detector. Therefore, the constant $I_d$ obtained is more accurate than the previous trial-and-error method. However, the experiments can be extremely costly. Hence, it's not desirable to obtain the to constant $I_d$ through performing experiment on the detector.

Please refer to TABLE 1. TABLE 1 shows the results after calibration using the method shown in the embodiment of FIG. 1 of the present disclosure.

TABLE 1

| | \multicolumn{7}{c}{Thickness} |
|---|---|---|---|---|---|---|---|
| | 25 | 50 | 75 | 100 | 125 | 150 | 175(um) |
| Intercept value | 0.2477 | 0.483 | 0.6926 | 0.9138 | 1.139 | 1.362 | 1.557 |
| Error | 0.9% | 1.3% | 8.2% | 7% | 8.8% | 7.9% | 7.3% |

As shown in Table 1, in the experiment result of an embodiment, when $I_d$ is selected as −28, the energy of the incident X-ray is 90 kV and the emission current is 60 μA, the thickness of the first absorbing material and the intercept value is about to be proportional. Therefore, the result shows very small errors with very good linearity.

The advantage of the present disclosure is to provide a method to estimate the thickness of the solder in a rapid way. Once the intercept value is obtained, only the two measured intensity values are needed, the calculation step is straightforward and no data base is needed.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A method for calibrating an transmissive energy imaging system for quantitatively determining the thickness of a first absorbing material in the presence of a second absorbing material where an incident transmissive energy having an incident intensity is transmitted through the first and second absorbing materials, wherein the method comprises the steps of:

fixing the thickness ($t_S$) of the first absorbing material and varying the thickness of the second absorbing material to obtain a calibration standard having a multiple combinations of thicknesses of the first and the second absorbing material;

exposing the calibration standard to the incident transmissive energy;

detecting the intensity of the incident transmissive energy which passes through the calibration standard by acquiring multiple pairs of image data which are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired;

changing the thickness ($t_{Si}$) of the first absorbing material to other fixed thicknesses and repeating the above steps to obtain a plurality sets of intensity data, wherein each set of the intensity data corresponds to a fixed thickness of the first absorbing material;

determining a fitting constant $I_d$ such that a plurality of intercept values $$\left(\frac{\mu_s}{\alpha} t_{Si}\right)$$

are each described by a line as a function of one of the set of the intensity data, wherein the line has the general form of:

$$\frac{\mu_s}{\alpha} t_S = \log_n(I_c + I_d) - \log_n(I_{c+s} + I_d)$$

where $\frac{\mu_s}{\alpha}$ is related to the characteristic of the first absorbing material and the generation process of the image data; and determining a best fit of the proportional constant $$\frac{\mu_s}{\alpha}$$

to accomplish the calibration.

2. The method of claim 1, further comprising the steps of:
  measuring foreground ($I_{c+s}'$) and background ($I_c'$) values for a combination of the first and the second absorbing materials having unknown thicknesses; and
  determining the corresponding unknown thickness of the first absorbing material ($t_s'$) through the calculation of the following equation:

$$t_s' = \frac{\alpha}{\mu_s}[\log_n(I_c' + I_d) - \log_n(I_{c+s}' + I_d)],$$

where $\frac{\alpha}{\mu_s}$ is the proportional constant determined previously.

3. The method of claim 1, wherein the intensity of the transmissive energy which passing through the calibration standard is related to the gray level of the image data.

4. The method of claim 1, wherein the transmissive energy is from an X-ray beam.

5. The method of claim 4, wherein the intensity of the transmissive energy passing through the calibration standard is detected with an X-ray is detector.

6. The method of claim 1, wherein the first and the second absorbing material is solder and copper respectively.

7. The method of claim 1, wherein the base n of the logarithm form is e, the logarithm form is a natural logarithm form.

8. A method for calibrating an transmissive energy imaging system for quantitatively determining the thickness of a first absorbing material in the presence of a second absorbing material where an incident transmissive energy having an incident intensity is transmitted through the first and second absorbing materials, wherein the method comprises the steps of:
  fixing the thickness ($t_S$) of the first absorbing material and varying the thickness of the second absorbing material to obtain a calibration standard having a multiple combinations of thicknesses of the first and the second absorbing material;
  exposing the calibration standard to the incident transmissive energy;
  detecting the intensity of the incident transmissive energy which passes through the calibration standard by acquiring multiple pairs of image data with a detector, wherein the multiple pairs of image data are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired;
  changing the thickness ($t_{Si}$) of the first absorbing material to other fixed thicknesses and repeating the above steps to obtain a plurality sets of intensity data, wherein each set of the intensity data corresponds to a fixed thickness of the first absorbing material;
  determining a constant $I_d$ by performing experiments on the detector to find out the relation between an incident energy and a detected intensity;
  determining a best fit of the proportional constant $$\frac{\mu_s}{\alpha}$$

to accomplish the calibration such that a plurality of intercept values $$\left(\frac{\mu_s}{\alpha}t_{Si}\right)$$

are each described by a line as a function of one of the set of the intensity data, wherein the line has the general form of:

$$\frac{\mu_s}{\alpha}t_S = \log_n(I_c + I_d) - \log_n(I_{c+s} + I_d)$$

where $\frac{\mu_s}{\alpha}$ is related to the characteristic of the first absorbing material and the generation process of the image data.

9. The method of claim 8, wherein the relation between the incident energy and the detected intensity is described as the form of:

$$E = a(I + I_d)^\alpha$$

where E is the incident energy, I is the detected intensity, a and $\alpha$ are sensor parameters.

10. The method of claim 8, further comprising the steps of:
  measuring foreground ($I_{c+s}'$) and background ($I_c'$) values for a combination of the first and the second absorbing materials having unknown thicknesses; and
  determining the corresponding unknown thickness of the first absorbing material ($t_s'$) through the calculation of the following equation:

$$t_s' = \frac{\alpha}{\mu_s}[\log_n(I_c' + I_d) - \log_n(I_{c+s}' + I_d)],$$

where $\frac{\alpha}{\mu_s}$ is the proportional constant determined previously.

11. The method of claim 8, wherein the intensity of the transmissive energy which passing through the calibration standard is related to the gray level of the image data.

12. The method of claim 8, wherein the transmissive energy is from an X-ray beam.

13. The method of claim 12, wherein the intensity of the transmissive energy passing through the calibration standard is detected with an X-ray detector.

14. The method of claim 8, wherein the first and the second absorbing material is solder and copper respectively.

15. The method of claim 8, wherein the base n of the logarithm form is e, the logarithm form is a natural logarithm form.

16. A method for measuring the thickness of a first absorbing material in the presence of a second absorbing material comprising the steps of:

fixing the thickness ($t_S$) of the first absorbing material and varying the thickness of the second absorbing material to obtain a calibration standard having a multiple combinations of thicknesses of the first and the second absorbing material;

exposing the calibration standard to a source of transmissive energy having an incident intensity;

detecting the intensity of the transmissive energy which passes through the calibration standard by acquiring multiple pairs of image data which are representative of a portion of the transmissive energy which is measured after transmission through the first and the second absorbing materials, where a logarithm form of a foreground value ($\log_n(I_{c+s})$) in each pair of image data corresponds to a portion of the incident intensity which is transmitted through the known thickness of the first absorbing material in combination with one of the multiple thicknesses of the second absorbing material, and the logarithm form of a background value ($\log_n(I_c)$) in each pair of transmitted intensities corresponds to a portion of the incident intensity which is transmitted through only the corresponding thickness of the second absorbing material which was in combination with the first absorbing material when the foreground value was acquired;

changing the thickness ($t_{Si}$) of the first absorbing material to other fixed thicknesses and repeating the above steps to obtain a plurality sets of intensity data, wherein each set of the intensity data corresponds to a fixed thickness of the first absorbing material;

determining a fitting constant $I_d$ such that a plurality of intercept values $$\left(\frac{\mu_s}{\alpha}t_{Si}\right)$$

are each described by a line as a function of one of the set of the intensity data, wherein the line has the general form of:

$$\frac{\mu_s}{\alpha}t_S = \log_n(I_c + I_d) - \log_n(I_{c+s} + I_d) \text{ where } \frac{\mu_s}{\alpha}$$

is related to the characteristic of the first absorbing material and the generation process of the image data;

determining a best fit of the proportional constant $$\frac{\mu_s}{\alpha}$$

to accomplish the calibration;

measuring foreground ($I_{c+s}'$) and background ($I_c'$) values for a combination of the first and the second absorbing materials having unknown thicknesses; and determining the corresponding unknown thickness of the first absorbing material ($t_s'$) through the calculation of the following equation:

$$t_s' = \frac{\alpha}{\mu_s}[\log_n(I_c' + I_d) - \log_n(I_{c+s}' + I_d)],$$

where $\dfrac{\alpha}{\mu_s}$ is the proportional constant determined in the calibration steps.

17. The method of claim 16, wherein the transmissive energy is from an X-ray beam, the intensity of the transmissive energy passing through the calibration standard is detected with an X-ray detector.

18. The method of claim 16, wherein the first and the second absorbing material is solder and copper respectively.

19. The method of claim 16, wherein the intensity of the transmissive energy which passing through the calibration standard is related to the gray level of the image data.

20. The method of claim 16, wherein the base n of the logarithm form is e, the logarithm form is a natural logarithm form.

* * * * *